(12) United States Patent
Brown et al.

(10) Patent No.: US 7,467,068 B2
(45) Date of Patent: Dec. 16, 2008

(54) METHOD AND APPARATUS FOR DETECTING DEPENDABILITY VULNERABILITIES

(75) Inventors: Aaron B. Brown, Croton on Hudson, NY (US); John W. Sweitzer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/682,207

(22) Filed: Mar. 5, 2007

(65) Prior Publication Data

US 2008/0221833 A1     Sep. 11, 2008

(51) Int. Cl.
*G06F 19/00* (2006.01)
*G06F 17/40* (2006.01)

(52) U.S. Cl. .............. 702/186; 324/73.1; 324/500; 324/527; 340/500; 340/540; 340/635; 340/653; 340/679; 702/1; 702/127; 702/182; 702/187; 702/189; 703/13; 703/22; 714/1; 714/25; 714/32; 714/47

(58) Field of Classification Search ............... 324/73.1, 324/500, 527, 537; 340/500, 540, 635, 653, 340/679; 702/1, 33, 34, 35, 108, 117, 124, 702/127, 182, 186, 187, 189; 703/13, 17, 703/21, 22; 714/1, 2, 3, 4, 5, 6, 7, 8, 10, 714/11, 13, 14, 15, 25, 32, 37, 47
See application file for complete search history.

(56) References Cited

U.S. PATENT DOCUMENTS

| | | | | |
|---|---|---|---|---|
| 2,950,437 A * | 8/1960 | Stahl | ............ | 324/73.1 |
| 2,996,666 A * | 8/1961 | Baker | ............ | 324/73.1 |
| 3,082,374 A * | 3/1963 | Buuck | ............ | 324/73.1 |
| 3,219,927 A * | 11/1965 | Topp, Jr. et al. | ............ | 714/735 |
| 3,413,536 A * | 11/1968 | Webb | ............ | 320/116 |
| 3,469,186 A * | 9/1969 | Gowan | ............ | 324/73.1 |
| 3,487,304 A * | 12/1969 | Kennedy | ............ | 324/73.1 |
| 3,603,934 A * | 9/1971 | Heath et al. | ............ | 714/2 |
| 4,057,847 A * | 11/1977 | Lowell et al. | ............ | 702/122 |
| 4,228,537 A * | 10/1980 | Henckels et al. | ............ | 714/33 |
| 4,999,837 A * | 3/1991 | Reynolds et al. | ............ | 714/703 |
| 5,202,639 A * | 4/1993 | McKeon et al. | ............ | 324/537 |
| 5,524,498 A * | 6/1996 | Thompson et al. | ............ | 73/865.9 |
| 5,984,178 A * | 11/1999 | Gill et al. | ............ | 235/379 |
| 6,211,681 B1 * | 4/2001 | Kagawa et al. | ............ | 324/426 |
| 6,279,826 B1 * | 8/2001 | Gill et al. | ............ | 235/379 |
| 6,560,720 B1 * | 5/2003 | Chirashnya et al. | ............ | 714/32 |
| 6,768,975 B1 * | 7/2004 | Gill et al. | ............ | 703/13 |
| 7,036,048 B1 * | 4/2006 | Gill et al. | ............ | 714/47 |
| 7,366,646 B1 * | 4/2008 | Gill et al. | ............ | 703/13 |
| 7,401,264 B1 * | 7/2008 | Gill et al. | ............ | 714/47 |

(Continued)

OTHER PUBLICATIONS

Kanoun, K., et al., "A Framework for Dependability Benchmarking", Proceedings of the 2002 Workshop on Dependability Benchmarking (at DSN 2002), Washington, D.C., Jun. 2003.

(Continued)

*Primary Examiner*—Edward R Cosimano

(57) ABSTRACT

The present invention is a method and an apparatus for detecting dependability vulnerabilities in production IT environments. In one embodiment, a method for detecting a dependability vulnerability in a production IT environment includes injecting a synthetic disturbance into the production IT environment and observing the response of the production IT environment to the synthetic disturbance.

18 Claims, 3 Drawing Sheets

U.S. PATENT DOCUMENTS 7,406,630 B1 * 7/2008 Gill et al. .................. 714/47

OTHER PUBLICATIONS

Madeira, H., et al., "Dependability Benchmarking: making choices in an n-dimensional problem space", First Workshop on Evaluating and Architecting Systems for Dependability, Göteborg, Sweden, 2001.

Brown, A., et al., "Embracing Failure: A Case for Recovery-Oriented Computing (ROC)", 2001 High Performance Transaction Processing Symposium, Asilomar, CA, Oct. 2001.

Nagaraja, K., et al., "Understanding and Dealing with Operator Mistakes in the Internet Services", Proceedings of the 6th Symposium on Operating System Design and Implementation (OSDI 2004), San Francisco, CA, Dec. 2004.

* cited by examiner

METHOD AND APPARATUS FOR DETECTING DEPENDABILITY VULNERABILITIES

BACKGROUND

The invention relates generally to information technology (IT), and relates more particularly to ensuring the dependability of IT environments.

IT environments are relied upon for business-critical functionality, and are thus designed to provide so-called dependable service. A dependable IT environment is one that tolerates and recovers from unexpected conditions in the environment, such as component failures, software bugs, unanticipated load patterns, malicious attacks, correlated failure, human operator error and the like.

IT environments are typically designed for dependability under the assumption that the IT environment and its dependability-ensuring mechanisms are in good working order. In practice, however, an IT environment will frequently encounter circumstances in which this assumption does not hold, and dependability is compromised. This may occur, for example, due to conditions that were not anticipated by the IT environment's architects or due to the accumulation of latent problems (e.g., failures, misconfigurations, corruptions, etc.) that do not on their own cause loss of dependability, but do reduce the readiness of the IT environment to handle future unexpected conditions. For example, the failure of a backup node in a clustered computing environment may not, on its own, affect functionality or performance (since the backup node is not used in normal operations). But the failure will make the computing environment vulnerable, because additional node failures cannot be tolerated.

Thus, there is a need for a method and an apparatus for detecting dependability vulnerabilities in production IT environments.

SUMMARY OF THE INVENTION

The present invention is a method and an apparatus for detecting dependability vulnerabilities in production IT environments. In one embodiment, a method for detecting a dependability vulnerability in a production IT environment includes injecting a synthetic disturbance into the production IT environment and observing the response of the production IT environment to the synthetic disturbance.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for detecting dependability vulnerabilities in production IT environments, including hidden dependability vulnerabilities. Embodiments of the invention proactively and automatically examine an IT environment during production use in order to substantially ensure that no hidden dependability vulnerabilities exist (i.e., the IT environment's dependability-ensuring mechanisms remain able to handle the unexpected conditions for which they were designed). The same techniques can be applied to substantially ensure that the dependability-ensuring mechanisms are capable of handling any newly-discovered unexpected conditions as well.

As used herein, the term "production IT environment" refers to a deployed, functioning IT environment (e.g., as opposed to an IT environment design).

Figure 1:
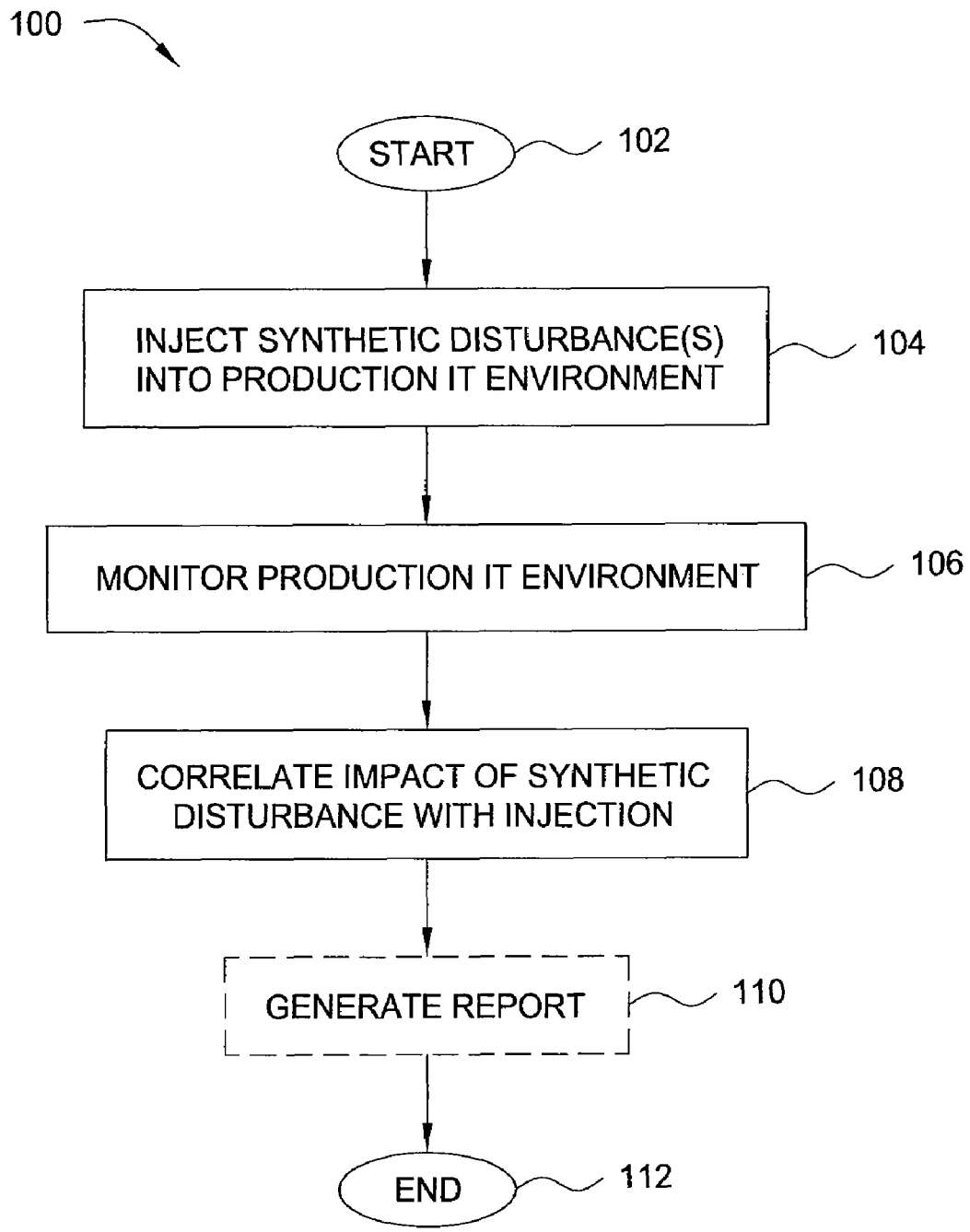
FIG. 1 is a flow diagram illustrating one embodiment of a method for detecting dependability vulnerabilities in a production IT environment, according to the present invention.

FIG. 1 is a flow diagram illustrating one embodiment of a method 100 for detecting dependability vulnerabilities in a production IT environment, according to the present invention. The method 100 may be applied to any IT environment, including a system that uses non-recovery-based techniques (e.g., replication) for dependability.

The method 100 is initialized at step 102 and proceeds to step 104, where the method 100 injects at least one synthetic disturbance into the production IT environment being tested. In one embodiment, a synthetic disturbance such as that injected into the production IT environment in step 102 is a disturbance that mimics any behavior in an IT environment that is not commonly expected in normal operation of the IT environment. Moreover, the synthetic disturbance is designed to explicitly trigger the production IT environment's dependability-ensuring mechanisms. Thus, in one embodiment, the injected synthetic disturbance(s) mimics at least one of: a hardware failure, a software failure, a firmware component failure, resource exhaustion, an unusual workload pattern, a shift in an applied load, a configuration error, a malicious attack, a software installation, a software removal, a hardware installation, a hardware removal, or a human operator error. Thus, the injected synthetic disturbance(s) may include a broad set of disturbances that extend beyond simple faults.

In one embodiment, the synthetic disturbance(s) is injected into the production IT environment in accordance with a defined schedule. In another embodiment, the synthetic disturbance(s) is injected into the production IT environment periodically (e.g., based on a repeating timer).

In step 106, the method 100 monitors the production IT environment in order to assess the impact of the injected synthetic disturbance(s). In one embodiment, this involves collecting data about how the production IT environment responds to the injection of the synthetic disturbance(s). In one embodiment, the collected data includes data on at least one of: performance, functionality, integrity or quality of service.

In step 108, the method 100 correlates the impact of the injected synthetic disturbance(s) (i.e., as assessed in step 106) with the actual injection of the synthetic disturbance(s) (i.e., in step 104), in order to determine whether or not the production IT environment is prepared to handle an unexpected condition (i.e., whether any dependability vulnerabilities exist). That is, the method 100 determines in step 108 whether the production IT environment's dependability-ensuring mechanisms remain able to handle the unexpected conditions for which they were designed.

In optional step 110 (illustrated in phantom), the method 100 generates a report based on the correlation performed in step 108 before terminating in step 112.

By injecting synthetic disturbances into the production IT environment and simultaneously monitoring and observing the production IT environment's response, the method 100 is able to determine, proactively, whether the production IT environment is compromised by latent problems or whether the dependability-ensuring mechanisms are working as intended, thereby revealing dependability vulnerabilities. Thus, the method 100 is capable of detecting improper implementation, configuration and functioning of the production IT environment's dependability-ensuring mechanisms. Moreover, the method 100 can detect hidden dependability vulnerabilities that can occur even when the production IT environment's recovery mechanisms are functioning properly.

Figure 2:
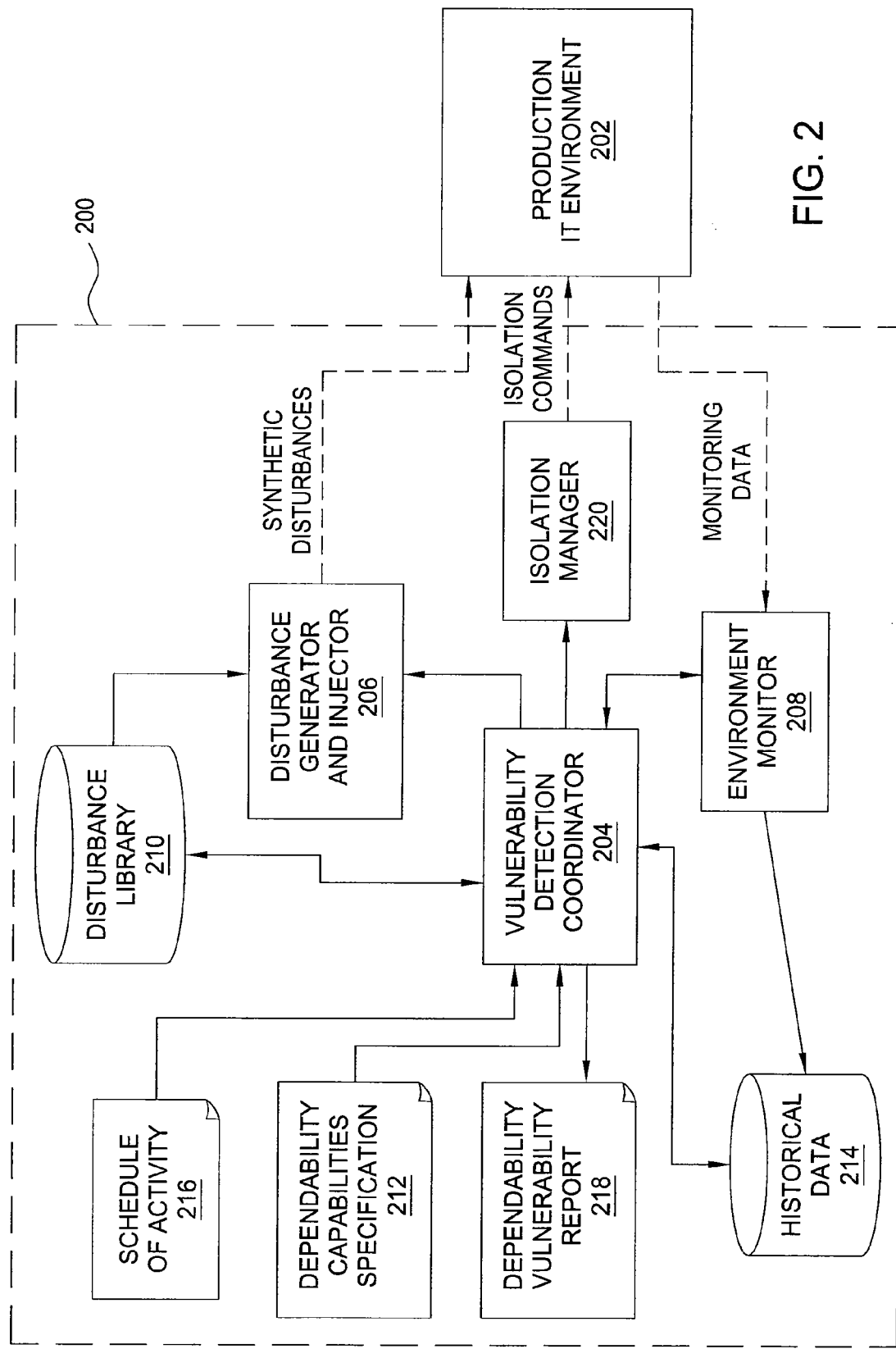
FIG. 2 is a schematic diagram illustrating one embodiment of a system for detecting dependability vulnerabilities in a production IT environment, according to the present invention.

FIG. 2 is a schematic diagram illustrating one embodiment of a system 200 for detecting hidden dependability vulnerabilities in a production IT environment, according to the present invention. In one embodiment, the system 200 is configured for implementing the method 100 described above with respect to FIG. 1. As illustrated, the system 200 is in communication with a production IT environment 202.

The system 200 comprises three primary components: a vulnerability detection coordinator 204, a disturbance generator and injector 206 and an environment monitor 208, all of which wrap around the production IT environment 202.

The vulnerability detection coordinator 204 automatically manages the process of proactively identifying hidden dependability vulnerabilities in the production IT environment 202. That is, when vulnerability probes are allowed, the vulnerability detection coordinator 204 initiates a vulnerability probing cycle. To this end, the vulnerability detection coordinator 204 is in communication with a disturbance library 210 that indexes one or more synthetic disturbances that are available for injection into the production IT environment 202. In one embodiment, the vulnerability detection coordinator 204 is in further communication with a dependability capabilities specification 212 that describes the nominal capabilities of the production IT environment's dependability-ensuring mechanisms. In a further embodiment, the vulnerability detection coordinator 204 is in communication with a repository 214 of historical data that stores information on one or more synthetic disturbances and any vulnerabilities revealed thereby in past proactive probing cycles. In a further embodiment still, the vulnerability detection coordinator 204 is in communication with a schedule of activity 216 that defines a schedule by which vulnerability probes should be initiated in the production IT environment 202.

In one embodiment, the vulnerability detection coordinator 204 is further configured to produce a dependability vulnerability report 218 or some other sort of proactive alert that describes the dependability vulnerabilities detected in the production IT environment 202 (e.g., the situations in which the production IT environment 202 was unable to handle an injected synthetic disturbance without visible impact to functionality, performance, integrity or quality of service).

The environment monitor 208 is in communication with the vulnerability detection coordinator 204 and is configured to continuously collect data from the production IT environment 202, which the vulnerability detection coordinator 204 then retrieves from the environment monitor 208. The data collected by the environment monitor 208 includes information about the workload that the production IT environment 202 is experiencing and about the extent to which the production IT environment 202 is providing the desired level of functionality, integrity, performance and quality of service. In one embodiment, the environment monitor 208 collects this data directly. In another embodiment, the environment monitor 208 collects this data using existing components of the production IT environment 202 (e.g., proxies, systems management agents, systems management tools and the like).

The disturbance generator and injector 206 is in communication with the vulnerability detection coordinator 204 and is configured to inject a selected set of synthetic disturbances into the production IT environment 202 at the instruction of the vulnerability detection coordinator 204. To this end, the disturbance generator and injector 206 is in communication with the disturbance library 210, which the disturbance generator and injector 206 accesses to retrieve generation and injection instructions for the selected set of synthetic disturbances.

In one embodiment, the system 200 further comprises an isolation manager 220. The isolation manager 220 is in communication with the vulnerability detection coordinator 204 and is configured to contain the effects of any injected synthetic disturbance that is not handled properly by the production IT environment's dependability-ensuring mechanisms. One example of an isolation manager that may be deployed in accordance with the present invention is described by K. Nagaraja et al. in "Understanding and Dealing with Operator Mistakes in Internet Services", Proceedings of the $6^{th}$ Symposium on Operating System Design and Implementation (OSDI 2004), San Francisco, Calif., Dec 2004.

In operation, the vulnerability detection coordinator 204 determines when to initiate a vulnerability probing cycle. In one embodiment, this determination is made either according to a repeating timer or to the schedule of activity 216. When a probe is to be initiated, the vulnerability detection coordinator 204 retrieves the index of the disturbance library 210 and cross references this index with the dependability capabilities specification 212 in order to select one or more synthetic disturbances for injection into the production IT environment 202. In one embodiment, if the dependability capabilities specification 212 is unavailable, the vulnerability detection coordinator 204 selects the entire library of synthetic disturbances for injection. In another embodiment, the historical data repository 214 is additionally or alternatively accessed to select synthetic disturbances that are known to have revealed vulnerabilities in past proactive probing cycles.

Once the set of synthetic disturbances have been selected for injection, the vulnerability detection coordinator 204 activates the environment monitor 208 and the disturbance generator and injector 206. The disturbance generator and injector 206 looks up each selected synthetic disturbance in the disturbance library and then injects the selected synthetic disturbance(s) into the production IT environment 202 in accordance with the generation and injection instructions. In the embodiment in which the system 200 includes an isolation manager 220, the vulnerability detection coordinator 204 further invokes the isolation manager 220 before invoking the disturbance generator and injector 206.

The environment monitor 208 collects data from the production IT environment 202 that is helpful in determining how the production IT environment 202 reacts to the injected synthetic disturbance(s). This data is then retrieved by the vulnerability detection coordinator 204. In one embodiment, the vulnerability detection coordinator 204 retrieves the data from the environment monitor 208 after each synthetic disturbance injection. In another embodiment, the vulnerability detection coordinator 204 retrieves the data from the environment monitor 208 after all synthetic disturbance injections. The vulnerability detection coordinator 204 then assesses the data retrieved from the environment monitor 208 in order to determine how the production IT environment 202 reacted to the injected synthetic disturbance(s). In one embodiment, the vulnerability detection coordinator 204 generates a dependability vulnerability report 218 (or other proactive alert) based on the assessment. In one embodiment, the dependability vulnerability report 218 is generated at the end of the injection cycle. In another embodiment, dependability vulnerability report 218 is generated at the first point at which an injected synthetic disturbance is not handled properly by the production IT environment's dependability-ensuring mechanisms.

In the embodiment in which the system 200 includes an isolation manager 220, isolation manager 220 situates the production IT environment 202 in a state wherein substantially all critical data is protected and wherein misbehavior will not be exposed to external users or to other IT environments with which the production IT environment 202 communicates. In one embodiment, this may be accomplished by using one or more of: virtualization technology that temporarily clones the production IT environment 202, network partitioning that isolates the production IT environment 202 from outside communication or recoverable snapshots, change logging and/or reverse execution that allow for undoing of any undesirable changes. Once the injection cycle is complete, the isolation manager 220 restores the production IT environment 202 to its normal (e.g., pre-injection cycle) working state.

Although the system 200 has been described as a plurality of discrete components having individual functionalities, those skilled in the art will appreciate that other implementations of the system 200 (for example, wherein the functionalities of two or more of such components are realized in a single component or wherein the functionality of a single component is shared by two or more components) are contemplated.

Figure 3:
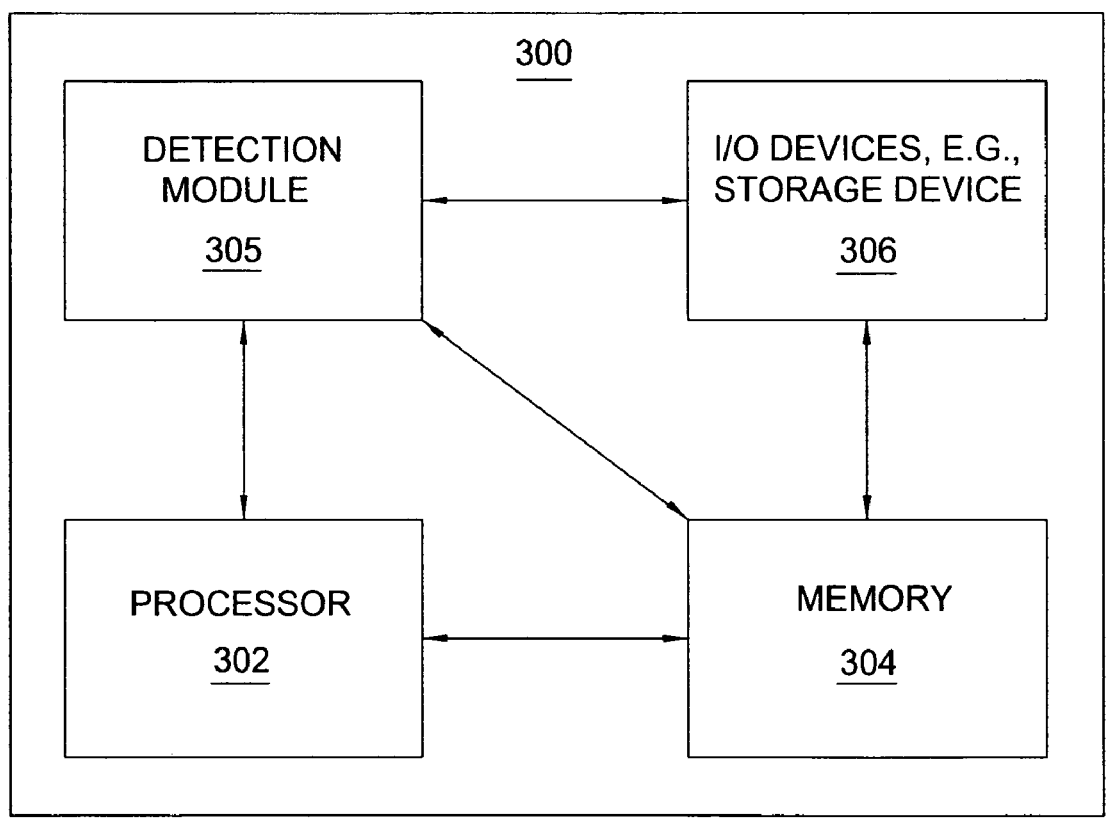
FIG. 3 is a high level block diagram of the dependability vulnerability detection method that is implemented using a general purpose computing device.

FIG. 3 is a high level block diagram of the dependability vulnerability detection method that is implemented using a general purpose computing device 300. In one embodiment, a general purpose computing device 300 includes a processor 302, a memory 304, a detection module 305 and various input/output (I/O) devices 306 such as a display, a keyboard, a mouse, a modem, and the like. In one embodiment, at least one I/O device is a storage device (e.g., a disk drive, an optical disk drive, a floppy disk drive). It should be understood that the detection module 305 can be implemented as a physical device or subsystem that is coupled to a processor through a communication channel.

Alternatively, the detection module 305 can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Thus, in one embodiment, the detection module 305 for detecting dependability vulnerabilities in a production IT environment described herein with reference to the preceding Figures can be stored on a computer readable medium or carrier (e.g., RAM, magnetic or optical drive or diskette, and the like).

Thus, the present invention represents a significant advancement in the field of information technology. Embodiments of the invention proactively and automatically examine an IT environment during production use in order to substantially ensure that no hidden dependability vulnerabilities exist (i.e., the IT environment's dependability-ensuring mechanisms remain able to handle the unexpected conditions for which they were designed). The same techniques can be applied to substantially ensure that the dependability-ensuring mechanisms are capable of handling any newly-discovered unexpected conditions as well.

While foregoing is directed to the preferred embodiment of the present invention, other and further embodiments of the invention may be devised without departing from the basic scope thereof, and the scope thereof is determined by the claims that follow.

We claim:

1. A method for detecting a dependability vulnerability in a production information technology environment, the method comprising:

injecting at least one synthetic disturbance into the production information technology environment, where the production information technology environment is a deployed, functioning information technology environment;

observing a response of the production information technology environment to the at least one synthetic disturbance; and generating a report indicative of one or more dependability vulnerabilities in the production information technology environment, the one or more dependability vulnerabilities being exposed via a response of the production information technology environment to the at least one synthetic disturbance.

2. The method of claim 1, wherein the injecting is performed automatically in accordance with a defined schedule.

3. The method of claim 1, wherein the injecting is performed periodically.

4. The method of claim 1, wherein the at least one synthetic disturbance mimics at least one of: a hardware failure, a software failure, a firmware component failure, resource exhaustion, an unusual workload pattern, a shift in an applied load, a configuration error, a malicious attack, a software installation, a software removal, a hardware installation, a hardware removal, or a human operator error.

5. The method of claim 1, wherein the observing comprises:

collecting data relating to an impact of the at least one synthetic disturbance on the production information technology environment; and correlating the data with the injecting in order to detect the existence of one or more dependability vulnerabilities.

6. The method of claim 5, wherein the data relates to at least one of: a workload that the production information technology environment is experiencing or an extent to which the production information technology environment is providing a desired level of functionality, integrity, performance and quality of service.

7. The method of claim 1, further comprising:

containing one or more effects of the at least one synthetic disturbance on the production information technology environment.

8. The method of claim 7, wherein the containing is achieved in accordance with at least one of: virtualization technology, network partitioning, recoverable snapshots, change logging, or reverse execution.

9. A computer readable storage medium containing an executable program for detecting a dependability vulnerability in a production information technology environment, the program causing a processor to perform the steps of:

injecting at least one synthetic disturbance into the production information technology environment, where the production information technology environment is a deployed, functioning information technology environment;

observing a response of the production information technology environment to the at least one synthetic disturbance; and generating a report indicative of one or more dependability vulnerabilities in the production information technology environment, the one or more dependability vulnerabilities being exposed via a response of the production information technology environment to the at least one synthetic disturbance.

10. A system for detecting a dependability vulnerability in a production information technology environment, the system comprising:

means for injecting at least one synthetic disturbance into the production information technology environment, where the production information technology environment is a deployed, functioning information technology environment;

means for observing a response of the production information technology environment to the at least one synthetic disturbance; and means for generating a report indicative of one or more dependability vulnerabilities in the production information technology environment, the one or more dependability vulnerabilities being exposed via a response of the production information technology environment to the at least one synthetic disturbance.

11. The system of claim 10, wherein the means for injecting is implemented automatically in accordance with a defined schedule.

12. The system of claim 10, wherein the means for injecting is implemented periodically.

13. The system of claim 10, wherein the means for injecting is configured to inject at least one synthetic disturbance mimicking at least one of: a hardware failure, a software failure, a firmware component failure, resource exhaustion, an unusual workload pattern, a shift in an applied load, a configuration error, a malicious attack, a software installation, a software removal, a hardware installation, a hardware removal, or a human operator error.

14. The system of claim 10, wherein the system wraps around the production information technology environment.

15. The system of claim 10, wherein the means for observing comprises:

means for collecting data relating to an impact of the at least one synthetic disturbance on the production information technology environment; and means for correlating the data with the injecting in order to detect the existence of one or more dependability vulnerabilities.

16. The system of claim 15, wherein the data relates to at least one of: a workload that the production information technology environment is experiencing or an extent to which the production information technology environment is providing a desired level of functionality, integrity, performance and quality of service.

17. The system of claim 10, further comprising:

means for containing one or more effects of the at least one synthetic disturbance on the production information technology environment.

18. The system of claim 17, wherein the containing is achieved in accordance with at least one of: virtualization technology, network partitioning, recoverable snapshots, change logging, or reverse execution.

* * * * *